United States Patent
Inaba et al.

(10) Patent No.: US 6,683,146 B2
(45) Date of Patent: Jan. 27, 2004

(54) HETEROGENEOUS POLYMERIZATION CATALYST, PROCESS FOR PRODUCING ACRYLIC POLYMER, AND ACRYLIC POLYMER

(75) Inventors: Yoshihiro Inaba, Minamiashigara (JP); Satoshi Hiraoka, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/293,326

(22) Filed: Nov. 14, 2002

(65) Prior Publication Data

US 2003/0078356 A1 Apr. 24, 2003

Related U.S. Application Data

(62) Division of application No. 09/576,549, filed on May 24, 2000, now abandoned.

(30) Foreign Application Priority Data

Jul. 5, 1999 (JP) ............................................. 11-190405

(51) Int. Cl.$^7$ ........................... C08F 118/02; B01J 31/00
(52) U.S. Cl. ...................... 526/319; 526/111; 526/115; 526/137; 526/201; 526/93; 502/159; 502/169; 502/527.14; 502/527.24
(58) Field of Search ................................ 526/319, 111, 526/115, 137, 93, 201, 219.6, 227; 502/159, 162, 169, 527.14, 527.24

(56) References Cited

U.S. PATENT DOCUMENTS

| | | |
|---|---|---|
| 3,708,462 A | 1/1973 | McKinley et al. |
| 4,179,403 A | 12/1979 | Kim et al. |
| 4,266,085 A | 5/1981 | Kim et al. |
| 4,306,085 A | 12/1981 | Kim et al. |
| 4,394,294 A | 7/1983 | Gryaznov et al. |
| 4,463,135 A | 7/1984 | Maly |
| 4,725,568 A | 2/1988 | Parker et al. |
| 5,112,787 A | 5/1992 | Falke et al. |
| 5,328,882 A | 7/1994 | Braca et al. |
| 5,348,987 A | 9/1994 | Kato et al. |
| 5,650,370 A | 7/1997 | Tennent et al. |

FOREIGN PATENT DOCUMENTS

| | | |
|---|---|---|
| JP | 56-33043 | 4/1981 |
| JP | 3-169350 | 7/1991 |
| JP | 4156951 | 5/1992 |
| JP | 10-7720 | 1/1998 |
| JP | 10-130317 | 5/1998 |
| JP | 10-152513 | 6/1998 |

OTHER PUBLICATIONS

M. Kato et al., *Macromolecules*, vol. 28, pp. 1721–1723, 1995.
K. Matyjaszewski, *Mechanistic and Synthetic Aspects of Atom Transfer Radical Polymerization*, J.M.S.—Pure Appl. Chem., A34(10), pp. 1785–1801 1997.
T. Ando et al., *Macromolecules*, vol. 28, pp. 1721–1723, 1995.
M. Imoto et al., *Polymer Complex Catalysts*, Japan Scientific Societies Press, pp. 167–193, 1982.
G. Moineau et al., *Macromolecules*, vol. 31, pp. 545–547, 1998.

*Primary Examiner*—Tatyana Zalukaeva
(74) *Attorney, Agent, or Firm*—Oliff & Berridge, PLC

(57) ABSTRACT

A process for producing an acrylic polymer capable of providing a polymer controlled in molecular weight and free of colorization, and a heterogeneous polymerization catalyst used in the process for producing an acrylic polymer are provided. The heterogeneous polymerization catalyst contains (A) a radical generating substance, (B) a metallic halide containing a metallic element selected from the group consisting of the Group 4 to Group 12 elements and a halogen element selected from the group consisting of chlorine, bromine and iodine, and (C) a carrier carrying a ligand capable of forming a coordination bond with the metallic halide (B). The process for producing an acrylic polymer contains a step of polymerizing a monomer containing at least an acrylate and/or a methacrylate in the presence of the heterogeneous polymerization catalyst.

15 Claims, No Drawings

HETEROGENEOUS POLYMERIZATION CATALYST, PROCESS FOR PRODUCING ACRYLIC POLYMER, AND ACRYLIC POLYMER

This application is a divisional application of application Ser. No. 09/576,549 filed May 24, 2000 now abandoned. The entire disclosure of the prior application is hereby incorporated by reference herein in its entirety.

FIELD OF THE INVENTION

The present invention relates to a heterogeneous polymerization catalyst containing a carrier having a specific ligand carried thereon, a process for producing an acrylic polymer by living radical polymerization conducted in the presence of the heterogeneous polymerization catalyst, and an acrylic polymer obtained by the process for producing an acrylic polymer.

BACKGROUND OF THE INVENTION

A living polymerization method having unique effects that cannot be obtained by other polymerization methods has been known, by which the molecular weight, the molecular weight distribution and the chemical structure of the resulting polymer can be precisely controlled, a multi-dimensional block copolymer can be easily produced, and the terminal modification can be easily conducted. As the living polymerization method, an anion polymerization method, a cation polymerization method and a group transfer polymerization method have been specifically known.

A living radical polymerization method is being earnestly studied in recent years as a polymerization method that is expected to provide effects that cannot be obtained by the various living polymerization methods described in the foregoing because the polymerization is difficult to be affected by impurities contained in the system, so that the polymerization operation is convenient, and the polymerization method can be applied to a wide range of monomers.

As the living radical polymerization method, the following polymerization methods have been known at the present time.

(1) A polymerization method using an organic halogen compound, $RuCl_2(PPh_3)_3$ (Ph: phenyl group) and a Lewis acid, as a polymerization catalyst (M. Kato, et al., *Macromolecules*, vol. 28, p. 1721 (1995))

(2) A polymerization method using an organic halogen compound and a CuCl/2,2,'-bipyridine complex, as a polymerization catalyst (Matyjaszewski, *Pure Appl. Chem.*, vol. A34(10), p. 1785 (1997))

(3) A polymerization method using an organic halogen compound and $RuCl_2(PPh_3)3$, as a polymerization catalyst (T. Ando, et al., *Macromolecules, vol.* 30, p. 4507 (1997))

(4) A polymerization method using an organic halogen compound, copper halide and, as a ligand, an organic phosphite triester, as a polymerization catalyst (JP-A-10-130317)

(5) A polymerization method using an organic halogen compound and a metallic complex having a specific ligand, as a polymerization catalyst (JP-A-10-152513)

However, because polymers obtained by these polymerization methods are colored, the polymers must be subjected to a decolorization and purification treatment after completing the polymerization reaction.

Since an adsorbent is generally used in the decolorization and purification treatment, there is a problem in that the yield of the polymer finally obtained is decreased. Furthermore, since the used adsorbent is treated as a waste, it brings about another problem in that the production cost is increased.

Therefore, the conventional living radical polymerization methods are disadvantageous due to the problems although they have the excellent effects that cannot be obtained by the other polymerization methods.

On the other hand, in order to easily separate a catalyst, various techniques utilizing a complex carried on a carrier as a radical polymerization catalyst have been known as disclosed in "mer Complex Catalysts", p. 167–193 (Japan Scientific Societies Press (1982)).

Furthermore, JP-A-10-7720 suggests, in the column of Detailed Description of the Invention, a technique for producing a polymer by the living radical polymerization method using a solid catalyst exhibiting both the advantages of a uniform catalyst and the advantages of a heterogeneous catalyst simultaneously, which is formed by carrying and grafting a metallic catalyst on a polysilane type dendrimer or a polysiloxane type polymer.

In JP-A-10-7720, however, a specific method, a constitution and an effect of the invention and performance of the living polymerization are not clearly disclosed, and the technique lacks actual practicability.

Furthermore, in the technique of carrying and grafting a metallic catalyst on a polysilane type dendrimer or a polysiloxane type polymer, a large number of steps are required, and the yield of the resulting polymer is low. Moreover, it is difficult to separate and recover the polymer from the reaction solution, and therefore the technique is not a practical production method. Accordingly, there has been no report in that a solid catalyst is successfully applied to the living radical polymerization.

As described in the foregoing, the conventional living radical polymerization method is a disadvantageous technique due to the problems although it has excellent effects that cannot be obtained by the other polymerization methods.

SUMMARY OF THE INVENTION

The invention has been made to solve the problems associated with the conventional techniques to provide a heterogeneous polymerization catalyst, a process for producing an acrylic polymer and an acrylic polymer obtained by the process.

In the invention, a polymer can be obtained that is precisely controlled in the molecular weight, the molecular weight distribution and the chemical structure thereof and is free of colorization, and therefore the invention provides a process for producing an acrylic polymer having advantages in that a step of decolorization and purification is not necessary, the yield of the resulting polymer is high, and the amount of wastes formed is small. The invention also provides a heterogeneous polymerization catalyst used for the process for producing an acrylic polymer, and an acrylic polymer produced by the process for producing an acrylic polymer.

The invention relates to, as a first aspect, a heterogeneous polymerization catalyst containing (A) a radical generating substance, (B) a metallic halide containing a metallic element selected from the group consisting of the Group 4 to Group 12 elements and a halogen element selected from the group consisting of chlorine, bromine and iodine, and (C) a carrier carrying a ligand capable of forming a coordination bond with the metallic halide (B) (which will be sometimes simply referred to as "a carrier carrying a ligand (C)").

As the radical generating substance (A), a halogen-containing organic compound having at least one carbon-halogen bond in the molecule is preferred, provided that the halogen element is either chlorine, bromine or iodine.

As the metallic halide (B), a metallic halide represented by $FeCl_2$ or $FeCl_2.H_2O$ (wherein n is an integer of from 1 to 6) is preferred.

In the case where the metallic halide (B) is a metallic halide represented by $RuCl_3$ or $RuCl_3.H_2O$, the heterogeneous polymerization catalyst preferably contains a Lewis acid.

As the carrier carrying a ligand (C), insoluble polymer particles having a phosphine as a ligand are preferred.

The carrier (C) preferably has a crosslinked structure as the molecular structure thereof. In the case where the shape of the carrier (C) is a particle form, the average diameter (D50) thereof is preferably from 1 to 100 $\mu$m. The carrier carrying a ligand (C) preferably has, in the molecular structure thereof, a unit having a ligand part and a styrene unit. The proportion of the ligand in the carrier carrying the ligand (C) is preferably from 0.1 to 3.0 mmol/g.

The invention relates to, as a second aspect, a process for producing an acrylic polymer containing a step of polymerizing a monomer containing at least an acrylate and/or a methacrylate in the presence of the heterogeneous polymerization catalyst according to the first aspect of the invention.

The invention relates to, as a third aspect, an acrylic polymer produced by the process for producing an acrylic polymer according to the second aspect of the invention.

DETAILED DESCRIPTION OF THE INVENTION

Polymerization Catalyst for Heterogeneous System

The heterogeneous polymerization catalyst according to the invention contains (A) a radical generating substance, (B) a metallic halide, and (C) a carrier carrying a ligand, and further contains other components depending on necessity.

In the heterogeneous polymerization catalyst according to the invention, the metallic halide (B) may be previously bonded by a coordination bond to the carrier carrying a ligand (C).

Radical Generating Substance (A)

While there is no particular limitation in the radical generating substance (A), a halogen-containing organic compound having at least one carbon-halogen bond in the molecule thereof and an azo compound (an azo series polymerization initiator) are generally preferred.

Halogen-Containing Organic Compound

While there is no particular limitation in the halogen-containing organic compound, preferred examples thereof include an organic halide having a carbon-halogen bond having high reactivity (for example, an ester compound having a halogen at the a position and a compound having a halogen at the benzyl position) and a halogenated sulfonyl compound, provided that the halogen element is either chlorine, bromine or iodine.

Preferred examples of the halogen-containing compound include $XCH_2$—$C_6H_5$, $CH_3CH(X)$—$C_6H_5$, $(CH_3)_2C(X)$—$C_6H_5$, $RO_2C$—$CH(X)$—$(CH_2)_n$—$CH_3$, $RO_2C$—$C(CH_3)(X)$—$(CH_2)_n$—$CH_3$, $RCO$—$CH(X)$—$(CH_2)_n$—$CH_3$, $RC(O)$—$C(CH_3)(X)$—$(CH_2)_n$—$CH_3$, $XCH_2CO$—$(CH_2)_N$—$CH_3$, $CH_3C(H)(X)CO$—$(CH_2)_n$—$CH_3$, $(CH_3)_2C(X)CO$—$(CH_2)_N$—$CH_3$, $XCH_2CO_2$—$(CH_2)_n$—$CH_3$, $CH_3C(H)(X)CO_2$—$(CH_2)_n$—$CH_3$, $(CH_3)_2C(X)CO_2$—$(CH_2)_n$—$CH_3$, $XCH_2CO$—$C_6H_5$, $X_2CHCO$—$C_6H_5$, $CH_3C(H)(X)CO$—$C_6H_5$, $(CH_3)_2C(X)COC_6H_5$, $XCH_2CO_2$—$C_6H_5$, $X_2HCO_2$—$C_6H_5$, $CH_3C(H)(X)CO_2$—$C_6H_5$, $(CH_3)_2C(X)CO_2$—$C_6H_5$ and $XSO_2$-$C_6H_5$.

In the chemical formulae, $C_6H_5$ represents a phenyl group, the hydrogen atom of which may be substituted by the other functional groups, X represents a halogen atom, R represents an alkyl group having from 1 to 20 carbon atoms, an aryl group or an aralkyl group, and n represents an integer of from 0 to 20.

The number of the carbon-halogen bond in the halogen-containing organic compound is generally 1 or more, and preferably 1 or 2.

An organic halide and a halogenated sulfonyl compound having two or more of the carbon-halogen bonds via an organic group are also preferred as the halogen-containing organic compound.

Azo Compound

While there is no particular limitation in the azo compound, compounds having at least one azo group in the molecule thereof that is decomposed by heat or light to form a radical molecule, which are known as an azo series polymerization initiator, are generally preferred.

Examples of the azo compound include 2,2'-azobisdimethylisobutylate, 2,2'-azobis(4-methoxy-2,4-dimethylvaleronitrile, 2,2'-azobisisobutyronitrile, 2,2'-azobis(2-methylbutyronitrile), 2,2'-azobis(2,4-dimethylvaleronitrile), 2,2'-azobis(2-methyl-N-(2-hydroxyethyl)propionamide and 2,2'-azobis(2-aminopropan)dihydrochloride. These may be used singly or in combination of two or more of them.

Metallic Halide (B)

The metallic halide (B) contains a metallic element and a halogen element.

Metallic Element

The metallic element is a metallic element selected from the Group 4 to Group 12 elements, and preferably a transition metallic element selected from the Group 8 to Group 11 elements. These may be used singly or combination of two or more of them. Among these, iron (II) and/or iron (III) are particularly preferred from the standpoint that the resulting polymer is not colored.

Halogen Element

The halogen element is a halogen element selected from the group consisting of chlorine, bromine and iodine, and one of them may be used singly, or two or more of them may be used in combination. Among these, chlorine is preferred from the standpoint of controllability of the molecular weight and the molecular weight distribution of the resulting polymer.

Carrier Carrying Ligand (C)

The carrier carrying a ligand (C) contains a ligand capable of forming a coordination bond with the metallic halide (B) (hereinafter sometimes simply referred to as "a ligand") and a carrier (C).

It is preferred that the carrier (C) carries the ligand by a chemical bond or an ionic bond.

Carrier (C)

While it is not completely clear why the ligand is necessarily carried on the carrier (C), the following can be expected.

In the case where the ligand is not carried on the carrier (C), the ligand is present in the form dissolved in the reaction system of the polymerization reaction since the ligand generally has high lipophilicity. Therefore, the ligand invades into the resulting polymer and incorporated therein. As a result, the ligand incorporated in the polymer and the metallic ion are reacted with each other to form a complex among the polymer molecule, and thus the resulting polymer is colored.

When the ligand is carried on the carrier (C), on the other hand, the ligand is not incorporated in the resulting polymer, and thus the resulting polymer is not colored. Therefore, by carrying the ligand on the carrier, in the production process of the polymer, the decolorization and purification step is not necessary or the polymer can be decolorized by a simple decolorization and purification step, as described later.

It is thus necessary that the carrier (C) can carry the ligand to prevent the ligand invading into the resulting polymer. Therefore, it is preferred that the carrier is insoluble in the other components, such as a polymerization solvent and a monomer.

The carrier (C) is not particularly limited as far as the conditions are satisfied, and preferred examples thereof include an organic compound, such as a polystyrene resin, a polyacrylic resin, a polymethacrylic resin and a polyester resin, and an inorganic compound, such as silica gel, alumina, zeolite and titanium oxide. These may be used singly or in combination of two or more of them. Among these, an organic compound is preferred from the standpoint that the ligand can be easily bonded by a coordination bond, and in particular, a polystyrene resin and a polymethacrylic resin are more preferred from the standpoint of suitable affinity with an organic solvent and easiness of forming a crosslinked structure.

In the case where the carrier (C) is the organic compound, it is particularly preferred that the molecular structure thereof includes a crosslinked structure.

In the case where the molecular structure of the carrier (C) does not contain a crosslinked structure, the catalyst is dissolved in the other components, such as the polymerization solvent and the monomer, and incorporated in the polymer to color it.

In order to obtain the crosslinked structure, a crosslinking agent is preferably used. As the crosslinking agent, while not particularly limited, divinylbenzene and ethylene glycol dimethacrylate are preferred in the case where the carrier (C) is a polystyrene resin from the standpoint of easiness of controlling the degree of crosslinking.

The form of the carrier (C) is not particularly limited and may be in a particle form or a fiber form.

In the case where the carrier (C) is in a particle form, examples of the shape thereof include a spherical shape and an irregular shape. The carrier (C) may be porous.

In the case where the carrier (C) is in a particle form, the size of the particles in terms of the average particle diameter (D50) is preferably from 0.1 to 500 $\mu$m, and more preferably from 1 to 100 $\mu$m.

When the average particle diameter (D50) is less than 0.1 $\mu$m, it is difficult to be separated from the reaction solution, and the ligand easily invades into the polymer to be incorporated therein, so as sometimes to color the resulting polymer. When it exceeds 500 pm, there are cases where the catalyst is poor in controllability of the molecular weight of the resulting polymer (living property).

Ligand

The ligand is not particularly limited as far as it can be bonded to the metallic halide (B) by a coordination bond, and a phosphine having a diphenylphosphino group, a triphenylphosphino group or an alkylphosphino group, a compound having a cyclopentadienyl group and a compound having a 2,2'-bipyridyl group are preferred from the standpoint of controllability of the molecular weight of the resulting polymer (living property). These may be used singly or in combination of two or more of them. Among these, a phosphine is particularly preferred since it can be easily produced.

Carrier carrying Ligand (C)

The proportion of the ligand in the carrier carrying the ligand (C) is preferably from 0.1 to 3.0 mmol/g.

When the proportion is less than 0.1 mmol/g, there are cases where the catalyst is poor in controllability of the molecular weight of the resulting polymer (living property) When it exceeds 3.0 mmol/g, there are cases where the ligand cannot be easily carried on the carrier (C).

The carrier carrying the ligand (C) can be produced, for example, by the following method.

(1) A monomer having a ligand, other monomers, such as styrene, and depending on necessity, a monomer functioning as a crosslinking agent, such as divinylbenzene, are copolymerized.

(2) A carrier (C) having a functional group, such as a chloromethyl group, is firstly produced, and then the ligand is introduced by a polymer reaction.

As the carrier carrying the ligand (C), polymer particles carrying a phosphine is preferred.

As the carrier carrying the ligand (C), commercially available products may be preferably used. For example, as the polymer particles carrying a phosphine, commercially available catalysts for a Witting reaction, specifically a triphenyl phosphine resin and a diphenylmethyl phosphine resin (produced by Kokusan Chemical Works, Ltd.), can be preferably used.

Other Components

Other components in the heterogeneous polymerization catalyst of the invention include a Lewis acid that can be added for improving the controllability of the molecular weight of the resulting polymer (living property). The Lewis acid is effectively used in the case where the heterogeneous polymerization catalyst contains an organic halogen compound as the radical generating substance (A) and $RuCl_2(PPh_3)_3$ (Ph: phenyl group) as the ligand. The use of the Lewis acid improves the controllability of the molecular weight of the resulting polymer (living property) and improves the reproducibility thereof.

While the Lewis acid is not particularly limited, Lewis acids including triethoxyaluminum and triisopropoxyaluminum are preferably used. These may be used singly or in combination of two or more of them.

The addition amount of the Lewis acid with respect to the carrier (C) is preferably from 0.01 to 10 in terms of weight ratio.

The addition of the Lewis acid has been disclosed in M. Sawamoto, et al., *Macromolecules*, vol. 28, p. 1721 (1995) listed in the foregoing.

Heterogeneous Polymerization Catalyst

In the heterogeneous polymerization catalyst of the invention, the combination of the radical generating substance (A) and the metallic halide (B) is not particularly limited, and those selected from the specific examples thereof can be appropriately combined and used. Among the combinations, the following ones are preferred from the standpoint of low production cost.

(1) Combination of the halogen-containing compound as the radical generating substance (A) and $FeCl_2$ or $FeCl_2 \cdot nH_2O$ (wherein n is an integer of from 1 to 6) as the metallic halide (B)

(2) Combination of the azo compound as the radical generating substance (A) and $FeCl_3$ or $FeCl_3 \cdot nH_2O$ (wherein n is an integer of from 4 to 6) as the metallic halide (B)

Between the combinations (1) and (2), the combination (1) is the most preferred from the standpoint of the controllability of the molecular weight of the resulting polymer (living property).

When the heterogeneous polymerization catalyst of the invention is used, because the ligand does not invade into the resulting polymer, the resulting polymer is not colored. Therefore, in the process for producing a polymer, no decolorization and purification step is provided, or the polymer can be decolorized by a simple decolorization and purification step.

Process for Producing Acrylic Polymer

In the process for producing an acrylic polymer of the invention, a monomer is polymerized in the presence of the heterogeneous polymerization catalyst of the invention.

Monomer

The monomer contains an acrylate and/or a methacrylate (hereinafter sometimes referred to as "a (meth)acrylate") and other monomers depending on necessity.

(Meth)acrylate

The (meth)acrylate is represented by the following general formula (I).

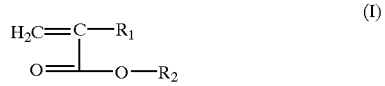

wherein $R_1$ represents a hydrogen atom or a methyl group, and $R_2$ represents an alkyl group having from 1 to 18 carbon atoms. Preferred examples of the alkyl group include a methyl group, an ethyl group, a propyl group, a butyl group and a hexyl group.

While the (meth)acrylate is not particularly limited, methyl methacrylate and butyl methacrylate are particularly preferred. These may be used singly or in combination of two or more of them.

Other Monomers

The other monomers are appropriately used for obtaining an acrylic copolymer. The other monomers are not particularly limited, and a vinyl series monomer, such as styrene, is particularly preferred.

Polymerization

The polymerization of the monomer is conducted in the presence of the heterogeneous polymerization catalyst of the invention.

While the polymerization method is not particularly limited, preferred examples thereof include block copolymerization, random copolymerization and telechelic polymerization, as well as homopolymerization.

In the polymerization, when the objective polymer is a block copolymer, for example, a first monomer is polymerized, and then a second monomer is polymerized.

In this case, a multi-stage polymerization method may be employed in that after completing the polymerization of the first monomer and separating the resulting polymer, a polymerization reaction is newly initiated by adding the components of the heterogeneous polymerization catalyst other than the radical generating substance (A). A single stage method may also be employed in that after completing the polymerization of the first monomer, the second monomer is added to the reaction system. The later method is preferred from the standpoint of production efficiency. In the later case, the components of the heterogeneous polymerization catalyst other than the radical generating substance (A) may be added along with the second monomer.

In the polymerization, the mixing ratio of the components of the heterogeneous polymerization catalyst, i.e., the proportions of the metallic halide (B) and the carrier carrying a ligand (C) based on the amount of the radical generating substance (A) as 1 is preferably from 1 to 10 and from 1 to 40, respectively, and more preferably from 1 to 8 and from 1 to 20, respectively.

In the case where the mixing ratio is outside the ranges described in the foregoing, there are cases where the controllability of the molecular weight of the resulting polymer (living property) is lowered.

The mixing ratio of the metallic halide (B) and the carrier carrying a ligand (C), (B)/(C), is preferably from 0.1 to 5.

When the ratio of the metallic halide (B) and the carrier carrying a ligand (C), (B)/(C), is outside the foregoing range, there are case where the polymerization rate is notably decreased, and the controllability of the molecular weight of the resulting polymer (living property) is lowered.

The amount of the carrier carrying a ligand (C) herein means the molar number of the ligand carried on the carrier (C).

In the polymerization, the mixing ratio of the monomer with respect to the heterogeneous polymerization catalyst cannot be directly determined because it depends on the molecular weight and the degree of polymerization of the objective polymer, and the mixing ratio of the radical generating substance (A) to the monomer (molar ratio) is preferably from 0.0001 to 0.02, and more preferably from 0.001 to 0.01.

When the mixing ratio of the radical generating substance (A) to the monomer (molar ratio) is less than 0.0001, there are cases where the polymerization rate is decreased, and when it exceeds 0.02, there are cases where the controllability of the molecular weight of the resulting polymer (living property) is lowered.

When the heterogeneous polymerization catalyst is mixed with the monomer in the polymerization, the order of mixing the respective components, i.e., the radical generating substance (A), the metallic halide (B) and the carrier carrying a ligand (C), is not particularly limited, and for example, it is possible that after mixing the metallic halide (B) and the carrier carrying a ligand (C), the radical generating substance (A) and the monomer are mixed, or in alternative, all the components including the monomer are mixed at a time.

The temperature of the polymerization is not particularly limited and is generally from −78 to 130° C., and preferably from 0 to 100° C.

The period of time of the polymerization is not particularly limited and is generally from 1 to 360 hours, and preferably from 10 to 100 hours.

In the polymerization, a solvent may be used depending on necessity. Preferred examples of the solvent, while not limited, include an inert solvent, such as cyclohexane, benzene, toluene, xylene, dimethylformamide (DMF), dimethyl sulfoxide (DMSO) and chloroform. These may be used singly or in combination of two or more of them.

While the carrier (C) is used as one component of the heterogeneous polymerization catalyst in the polymerization, the carrier (C) is liable to contain a gas on charging. Therefore, it is preferred that the charging operation of the respective components into a reaction vessel is conducted under an inert gas atmosphere.

The charging operation can be conducted in the air when a step of replacing the interior of the reaction system with an inert gas is conducted after charging. In this case, it is preferred that the reaction system is subjected to a deaeration treatment before the polymerization. For the deaeration treatment, a method of decreasing the pressure of the reaction system or a method using ultrasonic vibration can be appropriately employed.

As the inert gas, nitrogen and argon are preferred.

After completing the reaction of the polymerization, the carrier (C) is separated from the resulting reaction solution by a known method, such as filtration and centrifugation, and then the filtrate is put in a poor solvent to obtain an acrylic polymer as a deposit. The resulting acrylic polymer is preferably dried by a known drying method. As the poor solvent, methanol is preferably used. The carrier (C) thus separated can be reused for another polymerization reaction.

An acrylic polymer suffering substantially no coloration can be obtained by the process for producing an acrylic polymer of the invention. Therefore, no decolorization and purification treatment is needed, or only a simple decolorization and purification treatment is sufficient, and thus an acrylic polymer can be produced at a low cost with a high yield. Because the metallic halide (B) and the carrier (C) can be easily separated from the reaction system and reused, an acrylic polymer can be produced at a low cost. Furthermore, in the process for producing an acrylic polymer of the invention, because the controllability of the molecular weight of the resulting polymer is high as similar to the conventional living radical polymerization methods, an acrylic polymer having a narrow molecular weight distribution can be suitably produced.

Acrylic Polymer

The acrylic polymer of the invention is a polymer produced by the process for producing an acrylic polymer of the invention, and may be any of a block copolymer, a gradient type copolymer, a telechelic polymer and a macromer, as well as a homopolymer.

The acrylic polymer of the invention is of substantially no coloring without conducting a decolorization and purification treatment, and has a uniform molecular weight with a narrow molecular weight distribution. Therefore, the acrylic polymer of the invention can be preferably used as a member that requires no colorization at a low cost.

The invention will be further described in detail with reference to examples below, but the invention is not construed as being limited thereto.

EXAMPLE 1

A methyl methacrylate polymer is produced.

In a 50-ml sealing vessel, 0.04 g (0.2 mmol) of iron (II) chloride tetrahydrate (metallic halide (B)), 0.16 g of a triphenyl phosphine resin (loading capacity: 0.94 mmol/g, produced by Kokusan Chemical Works, Ltd.) (carrier carrying a ligand (C)) (carrier (C): a resin crosslinked with divinylbenzene, average diameter (D50): 45 μm) (molar number of the ligand: 0.15 mmol), and 6 g of toluene (solvent) are charged.

Thereafter, the interior of the sealing vessel is evacuated to conduct a deaeration treatment, and then a nitrogen gas (inert gas) is introduced into the sealing vessel. The operation is repeated three times to replace the interior of the sealing vessel with nitrogen.

A mixed solution of 0.02 g (0.11 mmol) of dichloroacetophenon (radical generating substance (A)) and 3.0 g (0.030 mol) of methyl methacrylate (monomer) is then added thereto, which is heated to 85° C., followed by reacting as they are for 22 hours.

After completing the reaction, toluene is added to the reaction system to decrease the viscosity of the solution in the sealing vessel, which is then filtered under reduced pressure to remove the carrier carrying a ligand (C). The resulting filtrate is put into methanol to obtain a deposit. It is separated by filtration under reduced pressure and then dried at 60° C. for 16 hours in vacuo, so as to produce a methyl methacrylate polymer (yield: 60%).

The resulting methyl methacrylate polymer has a molecular weight (number average molecular weight (Mn)) of $2.6 \times 10^4$, and a molecular weight distribution (Mw/Mn) of 1.29. The resulting methyl methacrylate polymer is of white color and exhibits a coloring level that requires no decolorization and purification treatment.

EXAMPLE 2

A butyl methacrylate polymer is produced.

In a 100-ml reaction vessel equipped with a stirring device, a condenser and a nitrogen introducing tube, 0.04 g (0.2 mmol) of iron (II) chloride tetrahydrate (metallic halide (B)), 0.16 g of a triphenyl phosphine resin (loading capacity: 0.94 mmol/g, produced by Kokusan Chemical Works, Ltd.) (carrier carrying a ligand (C)) (carrier (C): a resin crosslinked with divinylbenzene, average diameter (D50): 45 μm) (molar number of the ligand: 0.15 mmol), and 6 g of toluene (solvent) are charged.

A mixed solution of 0.02 g (0.1 mmol) of dichloroacetophenon (radical generating substance (A)) and 4.6 g (32 mmol) of butyl methacrylate (monomer) is then added thereto, which is heated to 85° C., followed by,reacting as they are for 22 hours.

After completing the reaction, toluene is added to the reaction system to decrease the viscosity of the solution in the reaction vessel, which is then filtered under reduced pressure to remove the resin. The filtrate is put into methanol to obtain a deposit. It is separated by filtration under reduced pressure and then dried at 60° C. for 16 hours in vacuo, so as to produce a butyl methacrylate polymer (yield: 56%).

The resulting butyl methacrylate polymer has a molecular weight (number average molecular weight (Mn)) of $2.6 \times 10^4$, and a molecular weight distribution (Mw/Mn) of 1.29. The resulting butyl methacrylate polymer is of white color and exhibits a coloring level that requires no decolorization and purification treatment, as similar to Example 1.

COMPARATIVE EXAMPLE 1

A methyl methacrylate polymer is produced.

The same procedures as in Example 1 are repeated except that 0.16 g of the triphenyl phosphine resin (loading capacity: 0.94 mmol/g, produced by Kokusan Chemical Works, Ltd.) (carrier carrying a ligand (C)) (carrier (C): a resin crosslinked with divinylbenzene, average diameter (D50): 45 μm) (molar number of the ligand: 0.15 mmol) is replaced by 0.04 g (0.15 mmol) of triphenyl phosphine (produced by Wako Pure Chemicals Industries, Ltd.), so as to produce a methyl methacrylate polymer (yield: 26%).

The resulting methyl methacrylate polymer has a molecular weight (number average molecular weight (Mn)) of $2.1 \times 10^4$, and a molecular weight distribution (Mw/Mn) of 1.27. The resulting methyl methacrylate polymer is colored brown and exhibits a coloring level that requires a decolorization and purification treatment.

COMPARATIVE EXAMPLE 2

A methyl methacrylate polymer is produced.

The same procedures as in Example 1 are repeated except that the addition amount of dichloroacetophenon (radical generating substance (A)) is changed from 0.02 g (0.11 mmol) to 0.057 g (0.3 mmol), and 0.04 g (0.2 mmol) of iron (II) chloride tetrahydrate (metallic halide (B)) and 0.16 g of the triphenyl phosphine resin (loading capacity: 0.94 mmol/ g, produced by Kokusan Chemical Works, Ltd.) (carrier carrying a ligand (C)) (carrier (C): a resin crosslinked with divinylbenzene, average diameter (D50): 45 μm) (molar number of the ligand: 0.15 mmol) are replaced by 0.14 g (0.15 mmol) of dichlorotris(triphenylsulfone) ruthenium (II) and 0.12 g (0.6 mmol) of aluminum isopropxide, so as to produce a methyl methacrylate polymer (yield: 62%).

The resulting methyl methacrylate polymer has a molecular weight (number average molecular weight (Mn)) of $1.8 \times 10^4$, and a molecular weight distribution (Mw/Mn) of 1.32. The resulting methyl methacrylate polymer is colored gray and exhibits a coloring level that requires a decolorization and purification treatment.

According to the invention, because a polymer is precisely controlled in the molecular weight, the molecular weight distribution and the chemical structure thereof and is free of colorization, the invention can provide a process for producing an acrylic polymer in that a decolorization and purification step is not necessarily provided, the yield of the resulting polymer is high, and the amount of waste formed is small, and the invention also provide a heterogeneous polymerization catalyst used in the process for producing an acrylic polymer and an acrylic polymer obtained by process for producing an acrylic polymer.

What is claimed is:

1. A process for producing an acrylic polymer comprising:
    polymerizing a monomer containing at least an acrylate and/or a methacrylate in the presence of a heterogeneous catalyst,
    wherein the heterogeneous polymerization catalyst comprises (A) a radical generating substance, (B) a metallic halide containing a metallic element selected from the group consisting of the Group 4 to Group 12 elements and a halogen element selected from the group consisting of chlorine, bromine and iodine, and (C) a carrier comprising crosslinked polymer particles or fibers, said carrier carrying a ligand capable of forming a coordination bond with the metallic halide (B).

2. A process for producing an acrylic polymer as set forth in claim 1, wherein the carrier is in particulate form.

3. A process for producing an acrylic polymer as set forth in claim 2, wherein the carrier in particulate form has an average particle diameter from 0.1 to 500 µm.

4. A process for producing an acrylic polymer as set forth in claim 2, wherein the carrier in particulate form is a polymer particulate.

5. A process for producing an acrylic polymer as set forth in claim 4, wherein the polymer particulate is a cross-linked polymer particulate.

6. A process for producing an acrylic polymer as set forth in claim 2, further comprising:
    efficiently removing the particulate as the polymerization catalyst after the polymerization is completed.

7. A process for producing an acrylic polymer as set forth in claim 1, wherein the amount of the ligand on the carrier carrying the ligand (C) is from 0.1 to 3.0 mmol per gram of carrier.

8. A process for producing an acrylic polymer as set forth in claim 1, wherein said carrier comprises a resin selected from the group consisting of polystyrene, polyacrylic, polymethacrylic, and polyester resins.

9. A process for producing an acrylic polymer as set forth in claim 1, wherein said carrier comprises a polystyrene resin.

10. A process for producing an acrylic polymer as set forth in claim 1, wherein said carrier comprises a polymethacrylic resin.

11. A process for producing an acrylic polymer as set forth in claim 1, wherein said carrier is in fiber form.

12. A process for producing an acrylic polymer as set forth in claim 1, wherein said carrier is porous.

13. A process for producing an acrylic polymer as set forth in claim 1, wherein said monomer containing at least an acrylate.

14. A process for producing an acrylic polymer as set forth in claim 1, wherein said monomer containing at least a methacrylate.

15. A process for producing an acrylic polymer as set forth in claim 1, wherein said monomer containing an acrylate and a methacrylate.

* * * * *